United States Patent
Jung (10) Patent No.: US 9,830,818 B2
(45) Date of Patent: Nov. 28, 2017

(54) PARKING ZONE RECOGNIZING APPARATUS AND CONTROL METHOD THEREOF

(71) Applicant: MANDO CORPORATION, Pyeongtaek-si, Gyeonggi-do (KR)

(72) Inventor: Soo Myung Jung, Seoul (KR)

(73) Assignee: MANDO CORPORATION, Pyeongtaek-si (KR)

(*) Notice: Subject to any disclaimer, the term of this patent is extended or adjusted under 35 U.S.C. 154(b) by 115 days.

(21) Appl. No.: 14/724,205

(22) Filed: May 28, 2015

(65) Prior Publication Data

US 2015/0348414 A1    Dec. 3, 2015

(30) Foreign Application Priority Data

May 30, 2014  (KR) .................. 10-2014-0065795

(51) Int. Cl.
| | |
|---|---|
| G08G 1/00 | (2006.01) |
| G08G 1/14 | (2006.01) |
| G01S 15/88 | (2006.01) |
| G08G 1/16 | (2006.01) |
| G01S 7/539 | (2006.01) |
| G01S 15/93 | (2006.01) |

(52) U.S. Cl.
CPC .............. G08G 1/14 (2013.01); G01S 7/539 (2013.01); G01S 15/88 (2013.01); G01S 15/931 (2013.01); G08G 1/168 (2013.01); *G01S 2015/932* (2013.01)

(58) Field of Classification Search
CPC .................. G08G 1/14; G08G 1/168
USPC ...................... 340/435, 436, 932.2
See application file for complete search history.

(56) References Cited

U.S. PATENT DOCUMENTS

| | | | | |
|---|---|---|---|---|
| 5,945,907 A | * | 8/1999 | Yaron ................ | B60Q 9/007 340/435 |
| 2007/0075875 A1 | * | 4/2007 | Danz ................. | B60Q 9/006 340/932.2 |

FOREIGN PATENT DOCUMENTS

KR    1020120091603 A    8/2012

* cited by examiner

*Primary Examiner* — Daryl Pope
(74) *Attorney, Agent, or Firm* — Hauptman Ham, LLP (57) ABSTRACT

A parking zone recognizing apparatus for recognizing a parking zone based on transmission/reception signals which are transmitted and received through an ultrasonic sensor installed in a vehicle, comprises an electronic control unit. The electronic control unit is configured to recognize a surrounding target of a parking zone as a high object and determine an available parking zone in the case of a double echo condition that a distance of a second echo signal is twice a distance of a first echo signal, the first echo signal and the second echo signal being determined among echo signals responding to the transmission signal transmitted through the ultrasonic sensor.

12 Claims, 10 Drawing Sheets

PILLAR

Fig. 5B

PILLAR

PARKING ZONE RECOGNIZING APPARATUS AND CONTROL METHOD THEREOF

CROSS-REFERENCE(S) TO RELATED APPLICATION

This application claims priority of Korean Patent Application No. 10-2014-0065795, filed on May 30, 2014, in the Korean Intellectual Property Office, which is hereby incorporated by reference in its entirety.

BACKGROUND OF THE INVENTION

Field of the Invention

The present invention relates to a parking zone recognizing apparatus and a control method thereof, and more particularly, to a parking zone recognizing apparatus and a control method thereof, which recognize a surrounding target in the parking zone as a high object when a double echo condition is satisfied, that is, when a distance of a second echo signal is twice a distance of a first echo signal, thus accurately securing an actually available parking zone, the first echo signal and the second echo signal being determined among echo signals responding to transmission signals transmitted through an ultrasonic sensor.

Description of the Related Art

An existing parking assist system recognizes a parking zone by detecting an object (obstacle) around the parking zone in which a vehicle is to be parked by using a sensor, such as an ultrasonic sensor mounted on a vehicle, and performs a parking assist control function by using recognition result information on the parking zone.

In order to stably and accurately park a vehicle by using the parking assist control system, it is necessary to correctly recognize a parking zone.

However, an existing parking zone recognition technology cannot discriminate between a parked vehicle and a pillar or a wall, which is an object higher than the parked vehicle, in a parking zone. Thus, an error may occur between an actual parking zone (actual space where a vehicle can be stably parked) and a recognized parking zone, making it impossible to accurately recognize the actual parking zone.

In particular, when a pillar is incorrectly recognized as a parked vehicle in a perpendicular parking situation, a vehicle may be parked close to the pillar, or when the vehicle is parked between the pillar and the parked vehicle, the vehicle may be parked close to the parked vehicle, causing a risk of collision. The pillar may be widely recognized as the parked vehicle and thus the available parking zone may not be recognized. Therefore, there is a need for an improved parking zone recognizing apparatus capable of discriminating between a pillar and a parked vehicle and accurately recognizing an actual parking zone.

Many applications (for example, Korean Patent Publication No. 10-2012-0091603 published on Aug. 20, 2012) disclose parking zone recognizing apparatuses.

The parking zone recognizing apparatus disclosed in Korean Patent Publication No. 10-2012-0091603 includes an upper sensor, a lower sensor, and a recognition processor which recognizes a parking zone by identifying whether an object is a parked vehicle or a pillar based on detection data detected through the two sensors.

However, the above-described parking zone recognizing apparatus needs to include both the upper sensor and the lower sensor in order to discriminate between the pillar and the parked vehicle. Therefore, product cost may increase and product implementation may be difficult.

CITATION LIST

Patent Literature (Patent literature 1) Korean Patent Application Publication No. 10-2012-091603 (2012.08.20) entitled "PARKING ZONE RECOGNIZING METHOD AND APPARATUS"

SUMMARY OF THE INVENTION

An aspect of the present invention is directed to a parking zone recognizing apparatus and a control method thereof, which recognize a surrounding target in a parking zone as a high object when a double echo condition is satisfied, that is, when a distance of a second echo signal is twice a distance of a first echo signal, thus accurately securing an actually available parking zone, the first echo signal and the second echo signal being determined among echo signals responding to transmission signals transmitted through an ultrasonic sensor.

According to an embodiment of the present invention, there is provided a parking zone recognizing apparatus for recognizing a parking zone based on transmission/reception signals which are transmitted and received through an ultrasonic sensor installed in a vehicle, the parking zone recognizing apparatus including: an electronic control unit configured to recognize a surrounding target of a parking zone as a high object and determine an available parking zone in the case of a double echo condition that a distance of a second echo signal is twice a distance of a first echo signal, the first echo signal and the second echo signal being determined among echo signals responding to the transmission signal transmitted through the ultrasonic sensor.

The electronic control unit may include: a reception unit configured to receive the echo signals responding to the transmission signal transmitted toward the proximity of the parking zone through the ultrasonic sensor; a calculation unit configured to calculate a first echo distance to the surrounding target of the parking zone based on the first echo signal that exceeds a preset threshold for the first time among the received echo signals, and calculate a second echo distance to the surrounding target of the parking zone based on the second echo signal that exceeds the preset threshold for the second time among the received echo signals; and an available parking zone determination unit configured to determine whether the double echo condition is satisfied, the double echo condition being a condition that the calculated second echo distance is twice the first echo distance, discriminately recognize the surrounding target of the parking zone as a high object or a parked vehicle based on the determination result, and determine the available parking zone based on the recognition result.

The available parking zone determination unit may calculate the number of double echoes of the echo signals which are reflected back from a front and edges of the surrounding target during a preset sampling period, recognize the surrounding target of the parking zone as a pillar when a double echo rate calculated based on the number of the double echoes from the front and the edges of the surrounding target is greater than a preset reference rate, and recognize the surrounding target of the parking zone as a parked vehicle when the double echo rate is less than the reference rate.

When only the high object is located as the surrounding target of the parking zone, the available parking zone determination unit may determine an available parking zone from a position spaced from the high object by a predetermined distance.

When the high object and the parked vehicle are located as the surrounding target of the parking zone, the available parking zone determination unit may determine an available parking zone between the high object and the parked vehicle, the determined available parking zone being closer to the high object.

When a double echo signal is continuously received from the ultrasonic sensor for a predetermined time, the electronic control unit may recognize the surrounding target of the vehicle as a high object.

According to another embodiment of the present invention, there is provided a method of controlling a parking zone recognizing apparatus for recognizing a parking zone based on transmission/reception signals which are transmitted and received through an ultrasonic sensor installed in a vehicle, the method including: performing control to recognize a surrounding target of a parking zone as a high object and determining an available parking zone in the case of a double echo condition that a distance of a second echo signal is twice a distance of a first echo signal, the first echo signal and the second echo signal being determined among echo signals responding to the transmission signal transmitted through the ultrasonic sensor.

The determining of the control may include: receiving the echo signals responding to the transmission signal transmitted toward the proximity of the parking zone through the ultrasonic sensor; calculating a first echo distance to the surrounding target of the parking zone based on the first echo signal that exceeds a preset threshold for the first time among the received echo signals, and calculating a second echo distance to the surrounding target of the parking zone based on the second echo signal that exceeds the preset threshold for the second time among the received echo signals; and determining whether the double echo condition is satisfied, the double echo condition being a condition that the calculated second echo distance is twice the first echo distance, discriminately recognizing the surrounding target of the parking zone as a high object or a parked vehicle based on the determination result, and determining the available parking zone based on the recognition result.

The calculating of the first second distances may include calculating the number of double echoes of the echo signals which are reflected back from a front and edges of the surrounding target during a preset sampling period, and calculating a double echo rate from the calculated number of the double echoes from the front and edges of the surrounding target, and the determining of the available parking zone may include recognizing the surrounding target of the parking zone as a pillar when the calculated double echo rate is greater than a preset reference rate, and recognizing the surrounding target of the parking zone as a parked vehicle when the double echo rate is less than the reference rate.

When only the high object is located as the surrounding target of the parking zone, the available parking zone may be determined from a position spaced from the high object by a predetermined distance.

When the high object and the parked vehicle are located as the surrounding target of the parking zone, the available parking zone may be determined between the high object and the parked vehicle, the determined available parking zone being closer to the high object.

When a double echo signal may be continuously received from the ultrasonic sensor for a predetermined time, the surrounding target of the vehicle is recognized as a high object.

DETAILED DESCRIPTION OF EXEMPLARY EMBODIMENTS

Exemplary embodiments of the present invention will be described below in detail with reference to the accompanying drawings.

Figure 1:
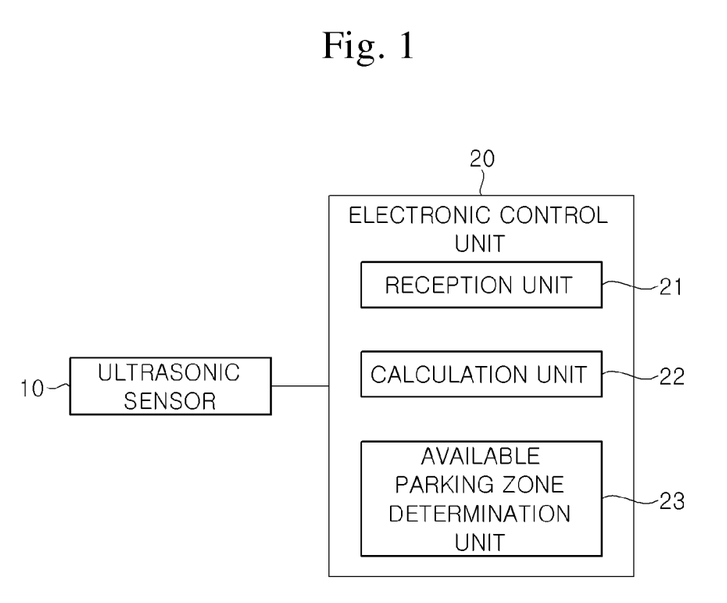
FIG. 1 is a block diagram of a parking zone recognizing apparatus according to an embodiment of the present invention.

FIG. 1 is a block diagram of a parking zone recognizing apparatus according to an embodiment of the present invention.

Referring to FIG. 1, the parking zone recognizing apparatus according to the embodiment of the present invention includes an ultrasonic sensor 10, and an electronic control unit 20 connected to the ultrasonic sensor 10 to determine an available parking zone in a parking zone.

The ultrasonic sensor 10 may measure a distance between a vehicle and a surrounding target (for example, a parked vehicle, a pillar, a wall, or other obstacles installed in the parking zone), which is located in the proximity of the vehicle in the parking zone.

The ultrasonic sensor 10 transmits a transmission signal to the surrounding target and receives an echo signal responding to the transmission signal in the parking zone. The ultrasonic sensor 10 receives echo signals that are returned after the transmission signal hits a front and edges of the surrounding target. Due to characteristics of the ultrasonic sensor 10, the ultrasonic sensor 10 determines a first echo signal and a second echo signal among the received signals, based on a threshold that is preset corresponding to a minimum detection distance, for example, 30 cm. The first echo signal is an echo signal that exceeds the preset threshold for the first time, and the second echo signal is an echo signal that exceeds the preset threshold for the second time.

The electronic control unit 20 is connected to the ultrasonic sensor 10 through, for example, a local interconnect network (LIN). The electronic control unit 20 receives the transmission signal and the echo signals, and determines the first echo signal and the second echo signal among the received echo signals. The electronic control unit 20 calculates distances of the first and second echo signals and determines whether a double echo condition is satisfied, that is, whether the calculated distance of the second echo signal is twice the calculated distance of the first echo signal.

When the double echo condition is satisfied, the electronic control unit 20 recognizes the surrounding target as a high object. When the double echo condition is not satisfied, the electronic control unit 20 recognizes the surrounding target as a parked vehicle. Then, the electronic control unit 20 determines an available parking zone based on the recognized information. The high object includes a pillar, a wall, and the like, which are located in the parking zone.

In addition, when a double echo signal is received from the ultrasonic sensor 10 for a predetermined time, the electronic control unit 20 may recognize the surrounding target as a high object. The double echo signal refers to a signal that satisfies the above-described double echo condition, that is, a signal of which the distance is double (twice the distance of the first echo signal) among second echo signals.

The electronic control unit 20 includes a reception unit 21, a calculation unit, an available parking zone determination unit 23.

The reception unit 21 receives echo signals that is returned after the transmission signal transmitted from the ultrasonic sensor 10 hits the surrounding target located in the parking zone, and determines the first echo signal that exceeds the preset threshold for the first time and the second echo signal that exceeds the preset threshold for the second time among the echo signals.

Figure 7A:
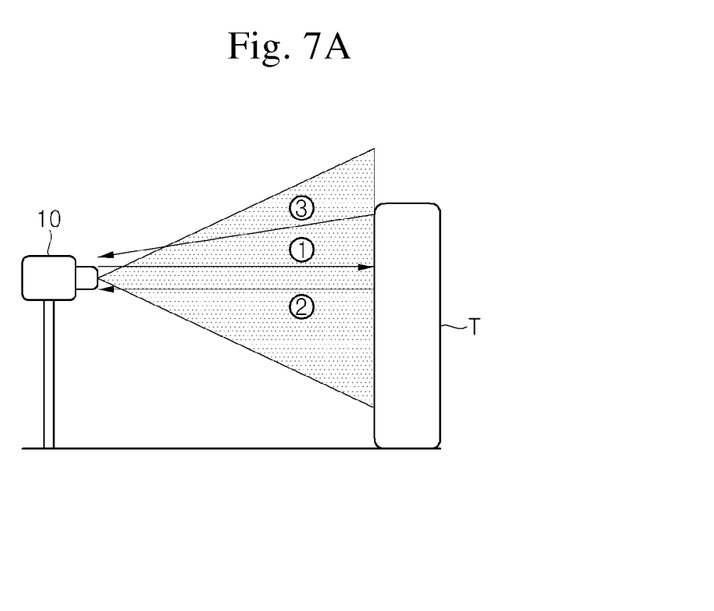
FIGS. 7A to 7C are diagrams for describing a first echo signal and a second echo signal.

Referring to an environment illustrated in FIG. 7A, the first echo signal refers to an echo signal that hits a front side of an object T facing the object T at the closest distance and has a voltage exceeding the preset threshold Th. The second echo signal refers to an echo signal that has a voltage exceeding the preset threshold Th among signals which hit edges of the object T and return to the ultrasonic sensor 10. In addition to the first and second echo signals, third and fourth echo signals are present. However, since the voltages of the third and fourth signals are lower than the threshold Th, only the first and second echo signals are considered in the present invention.

Figure 7B:
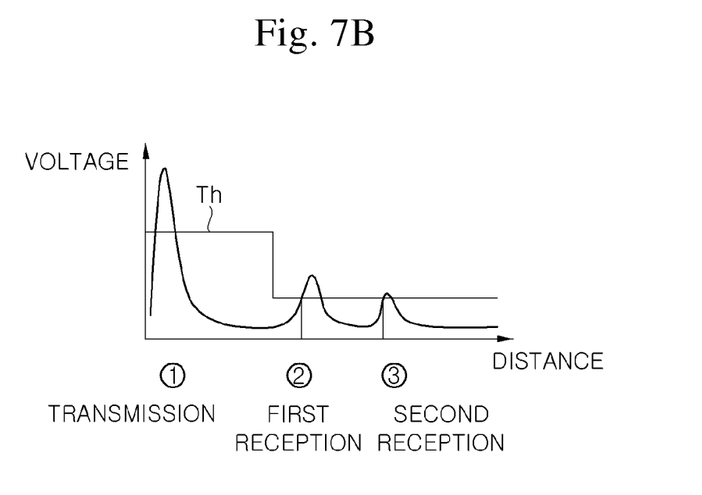
Figure 7C:
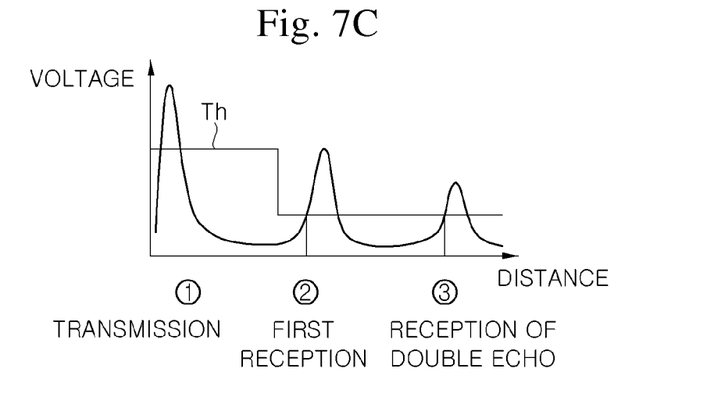

FIG. 7B is a graph of a transmission signal 1, which is transmitted toward a low object, such as a parked vehicle, through the ultrasonic sensor 10, and echo signals 2 and 3 responding to the transmission signal 1, and FIG. 7C is a graph of a transmission signal 1, which is transmitted toward a high object, such as a pillar, through the ultrasonic sensor 10, and echo signals 2 and 3 responding to the transmission signal 1, Referring to FIGS. 7B and 7C, a low object such as a parked vehicle does not satisfy the double echo condition because a distance calculated from the second echo signal 3 is not twice a distance calculated from the first echo signal 2. However, a high object such as a pillar satisfies the double echo condition because a distance calculated from the second echo signal 3 is twice a distance calculated from the first echo signal 2.

Therefore, the electronic control unit 20 determines whether the distance calculated from the second echo signal is twice the distance calculated from the first echo signal by using the first and second echo signals among the echo signals received through the ultrasonic sensor 10. When the double echo condition is satisfied, the electronic control unit 20 recognizes the surrounding target of the parking zone as a pillar that is a high object.

The calculation unit 22 calculates a first echo distance to a target located in the parking zone, according to the first echo signal determined based on the echo signals received by the reception unit 21. In addition, the calculation unit 22 calculates a second echo distance to the target located in the parking zone, according to the second echo signal determined based on the echo signals received by the reception unit 21.

The available parking zone determination unit 23 determines whether the double echo condition is satisfied, that is, whether the second echo distance calculated by the calculation unit 22 is twice the first echo distance calculated by the calculation unit 22. The double echo condition includes a condition that the second echo distance is twice the first echo distance or a condition defined by Formula 1 below. In this case, 30 cm is a set value and a different value may be applied according to characteristics of the ultrasonic sensor 10 installed in the vehicle. In the present embodiment, it is assumed that the ultrasonic sensor 10 of the parking zone recognizing apparatus installed in the vehicle has a minimum detection distance of 30 cm.

$$|1^{st} \text{ echo distance} \times 2 - 2^{nd} \text{ echo distance}| < 30 \text{ cm} \quad (1)$$

When the second echo distance is twice the first echo distance or when Formula 1 above is satisfied, the available parking zone determination unit 23 recognizes the target of the parking zone as a high object (for example, a pillar or a wall). Otherwise, the available parking zone determination unit 23 recognizes the target of the parking zone as a parked vehicle.

In order to improve recognition reliability, the available parking zone determination unit 23 may calculate a double echo rate through Formula 2 below, and recognize the target as a high object or a parked vehicle according to whether the calculated double echo rate is greater than a preset reference rate, for example, 50%.

$$\frac{\text{number of double echoes of } N}{\text{total number of double echoes of } R + N + F} \times 100 = \quad (2)$$

$$\text{Double echo rate (\%)}$$

Figure 6A:
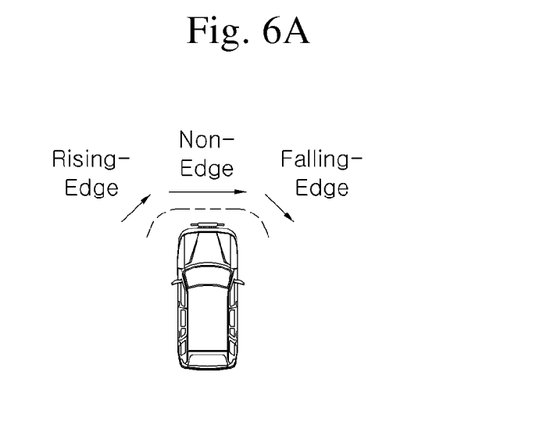
FIGS. 6A to 6F are diagrams illustrating planes of a pillar and a parked vehicle which a transmission signal hits, and graphs illustrating reception signals measured through the planes of the pillar and the parked vehicle.
Figure 6B:
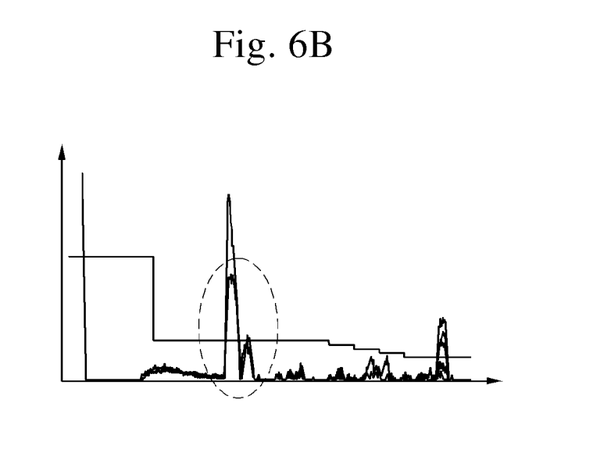
Figure 6C:
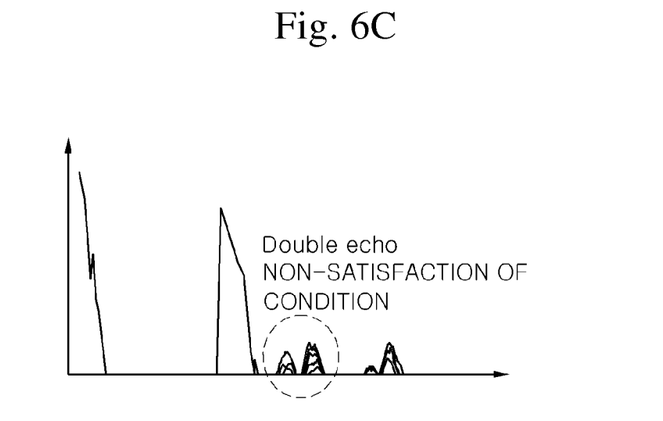
Figure 6D:
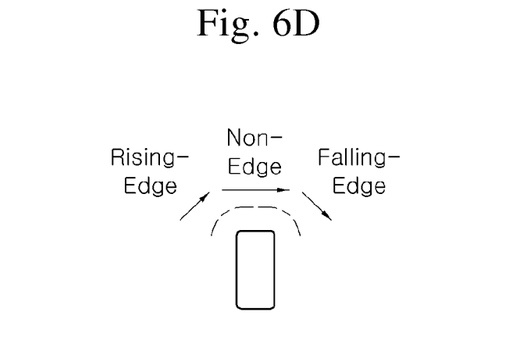

As illustrated in FIGS. 6A and 6D, in Formula 2 above, R is the total number of rising-edge double echoes, and N is the total number of non-edge double echoes, and F is the total number of falling-edge double echoes.

FIG. 6B is a graph of echo signals received with respect to rising edges and falling edges when the surrounding target is the parked vehicle as illustrated in FIG. 6A, and FIG. 6C is a graph of echo signals received with respect to non-edges. It can be seen from FIGS. 6B and 6C that echo signals satisfying no double echo condition are received.

Figure 6E:
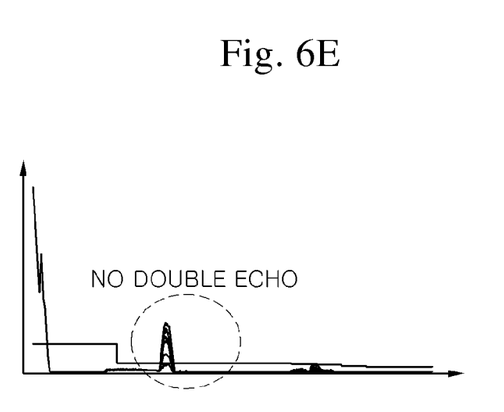
Figure 6F:
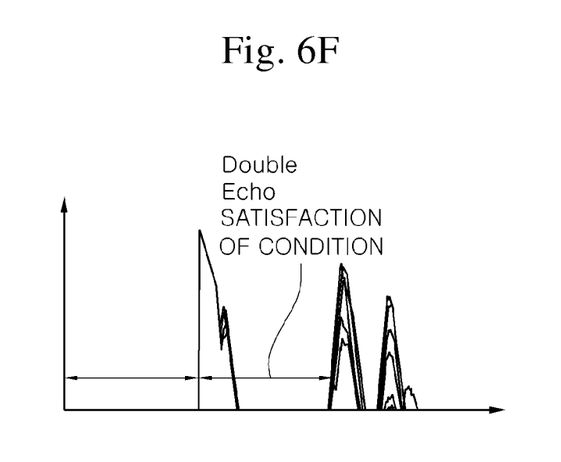

FIG. 6E is a graph of echo signals received with respect to rising edges and falling edges when the surrounding target is the pillar as illustrated in FIG. 6D, and FIG. 6F is a graph of echo signals received with respect to non-edges. It can be seen from FIGS. 6E and 6F that the double echo condition is not satisfied in the rising edges and the falling edges, but is satisfied in the non-edges.

As described above, the double echo condition that the distance of the second echo signal is twice the distance of the first echo signal is not mostly generated in the rising and falling edges of the parked vehicle.

When only a high object (for example, the pillar) is located as the target in the parking zone at the time of parking, the available parking zone determination unit 23 determines an available parking zone having a predetermined vehicle width, at a position spaced apart from the high object by a predetermined distance. When a height of the target in the parking zone is between a height of a high object and a height of a parked vehicle, the available parking zone determination unit 23 determines an available parking zone having a predetermined vehicle width, at a position close to the high object. In addition, the available parking zone determination unit 23 may determine, as an available parking zone, a zone which had not been recognized as an available parking zone in the past, because a high object is not widely recognized as a parked vehicle and is recognized as the high object, such as the pillar or the wall.

Therefore, it is possible to solve the problem of non-recognition of an available parking zone because discriminately recognizing a high object and a parked vehicle in a parking zone. In addition, it is possible to determine an available parking zone such that a vehicle is parked to be close to or spaced apart from a high object when only the high object is located, and determine a central zone between the high object and the parked vehicle as an available parking zone in a space between the high object and the parked vehicle at the time of parking, thereby determining, as the available parking zone, a parking zone which had not been recognized as an available parking zone because the high object is widely recognized as the parked vehicle.

A method of controlling the parking zone recognizing apparatus having the above-described configuration will be described with reference to FIG. 2.

Figure 2:
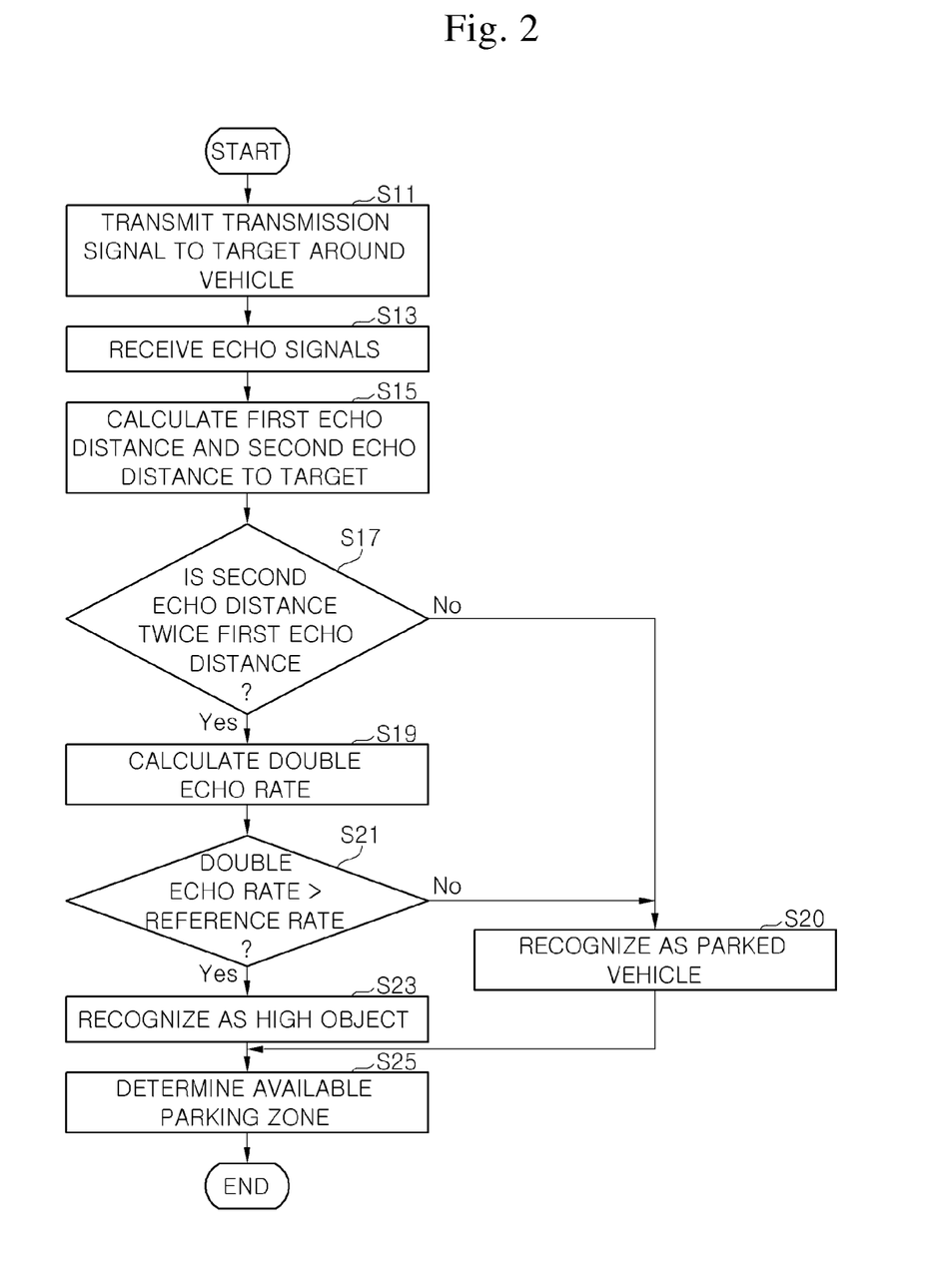
FIG. 2 is a flowchart of a method of controlling a parking zone recognizing apparatus according to an embodiment of the present invention.

FIG. 2 is a flowchart of the method of controlling the parking zone recognizing apparatus according to an embodiment of the present invention.

Referring to FIG. 2, in step S11, the ultrasonic sensor 10 included in the parking zone recognizing apparatus transmits a predetermined transmission signal to a surrounding target around a vehicle in a parking zone.

In step S13, the ultrasonic sensor 10 receives echo signals that are returned after the transmission signal hits the front and edges of the surrounding target.

In step S15, the electronic control unit 20 determines a first echo signal that exceeds a preset threshold for the first time and a second echo signal that exceeds the preset threshold for the second time among echo signals received through the ultrasonic sensor 10, and calculates a first echo distance and a second echo distance to a target with respect to the first echo signal and the second echo signal.

In step S17, the electronic control unit 20 determines whether a double echo condition is satisfied, that is, whether the calculated second echo distance is twice the first echo distance. The double echo condition may be a condition that the second echo distance is twice the first echo distance or a condition defined by Formula 1 above.

In step S20, when it is determined in step S17 that the double echo condition is not satisfied, the electronic control unit 20 recognizes the target as a parked vehicle.

In step S19, when it is determined in step S17 that the double echo condition is satisfied, the electronic control unit 20 calculates a double echo rate during a sampling period. The double echo rate may be calculated by Formula 2 above. Although step S19 has been described as being performed when the double echo condition is satisfied, the electronic control unit 20 may proceed to step S19 when a double echo signal is continuously received for a predetermined time in the case of satisfaction of the double echo condition.

In step S21, the electronic control unit 20 determines whether the calculated double echo rate is greater than a preset reference rate (for example, 50%).

In step S23, when it is determined in step S21 that the calculated double echo rate is greater than the reference rate, the electronic control unit 20 recognizes the target as a high object.

When it is determined in step S21 that the calculated double echo rate is less than the reference rate, the electronic control unit 20 proceeds to step S20 and recognizes the target as a parked vehicle.

Figure 3A:
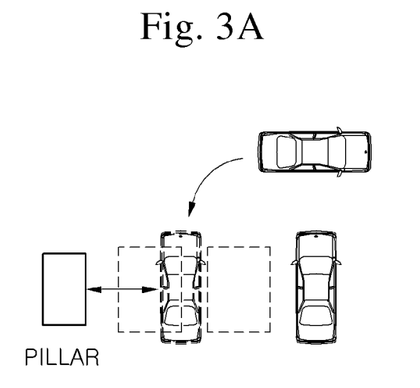
FIGS. 3A and 3B are schematic diagrams for describing a method of determining an available parking zone at the time of parking when pillars are located in a parking zone.
Figure 3B:
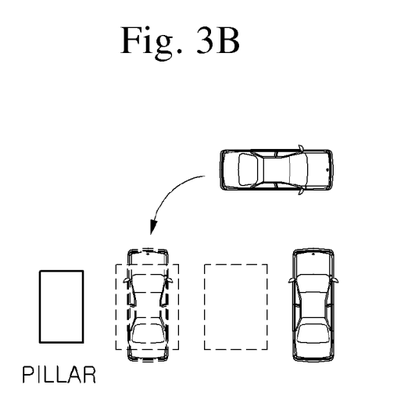
Figure 4A:
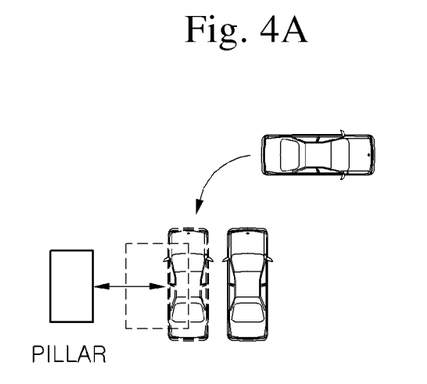
FIGS. 4A and 4B are schematic diagrams for describing a method of determining an available parking zone at the time of parking between a pillar and a parked vehicle.
Figure 4B:
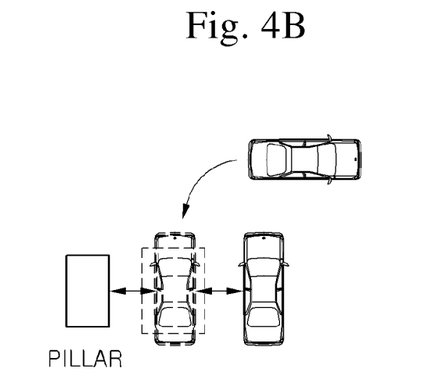
Figure 5A:
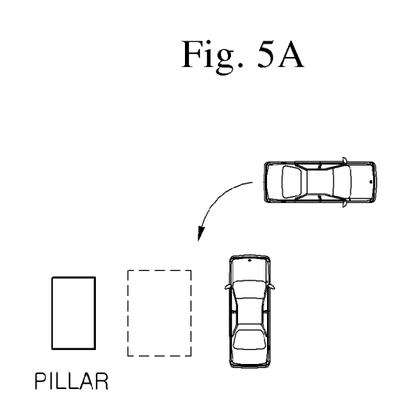
FIGS. 5A and 5B are schematic diagrams for describing a method of correctly recognizing a pillar and determining an available parking zone.
Figure 5B:
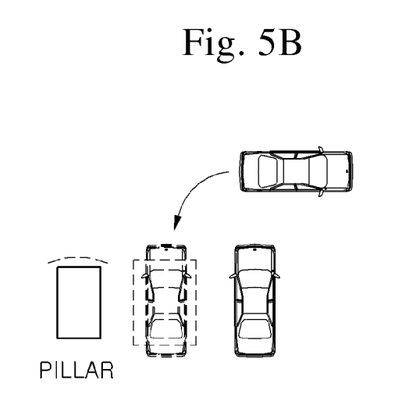

As described above, it is possible to find out an available parking zone even in the environments as illustrated in FIGS. 3 to 5 by discriminately recognizing a parked vehicle and an object higher than the parked vehicle in a parking zone.

Referring to FIG. 3A, in the past, an existing parking zone recognizing apparatus determines an available parking zone that is as large as a vehicle width from a position spaced apart from the pillar when only a high object (hereinafter, referred to as a "pillar") is located in the parking zone. Referring to FIG. 3B, the parking zone recognizing apparatus according to the present invention correctly recognizes a pillar located in a parking zone and determines an available parking zone that is as large as a vehicle width from a position spaced from the pillar by a predetermined distance. Therefore, it is possible to determine an available parking zone at a position spaced from the pillar by a predetermined distance when only a pillar is located in a parking zone, thereby securing many available parking zones, as compared to the existing parking zone recognizing apparatus.

Referring to FIG. 4A, the existing parking zone recognizing apparatus determines a zone close to a parked vehicle as an available parking zone in a space between a pillar and the parked vehicle in a parking zone at the time of parking. Referring to FIG. 4B, the parking zone recognizing apparatus according to the present invention correctly recognizes the pillar and determines a central zone between the pillar and the parked vehicle as an available parking zone. Therefore, it is possible to reduce a risk of collision occurring when a vehicle is parked close to the parked vehicle at the time of parking between the pillar and the parked vehicle.

Referring to FIG. 5A, the existing parking zone recognizing apparatus incorrectly recognize a pillar as a parked vehicle and hardly determines an available parking zone. Referring to FIG. 5B, the parking zone recognizing apparatus according to the present invention correctly recognizes the pillar and easily determines an available parking zone. Accordingly, it is possible to easily find out an available parking zone in an actual parking zone.

According to the embodiments of the present invention, it is possible to recognize a surrounding target of a parking zone as a high object when a double echo condition is satisfied, that is, when a distance of a second echo signal is twice a distance of a second echo signal, thus accurately securing an actual available parking zone, wherein the first echo signal and the second echo signal are determined among echo signals responding to a transmission signal transmitted through an ultrasonic sensor. In particular, it is possible to solve a problem occurring when a target located in a parking zone is incorrectly recognized as not a high object but a parked vehicle.

According to the embodiments of the present invention, the number of double echoes of echo signals which are reflected back from a front and edges of the surrounding target during a preset sampling period is calculated. When a double echo rate calculated based on the number of the double echoes from the front and the edges of the surrounding target is greater than a preset reference rate, the surrounding target of the parking zone is recognized as a pillar.

When the double echo rate is less than the reference rate, the surrounding target around the parking zone is recognized as a parked vehicle. Therefore, recognition reliability can be improved.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

10: ultrasonic sensor     20: electronic control unit
21: reception unit        22: calculation unit
23: available parking zone determination unit

What is claimed is:

1. A parking zone recognizing apparatus for recognizing a parking zone based on transmission/reception signals which are transmitted and received through an ultrasonic sensor installed in a vehicle, the parking zone recognizing apparatus comprising:
   an electronic control unit configured to recognize a surrounding target of a parking zone as a high object and determine an available parking zone in the case of a double echo condition that a distance of a second echo signal is twice a distance of a first echo signal, the first echo signal and the second echo signal being determined among echo signals responding to the transmission signal transmitted through the ultrasonic sensor.

2. The parking zone recognizing apparatus according to claim 1, wherein the electronic control unit comprises:
   a reception unit configured to receive the echo signals responding to the transmission signal transmitted toward the proximity of the parking zone through the ultrasonic sensor;
   a calculation unit configured to calculate a first echo distance to the surrounding target of the parking zone based on the first echo signal that exceeds a preset threshold for the first time among the received echo signals, and calculate a second echo distance to the surrounding target of the parking zone based on the second echo signal that exceeds the preset threshold for the second time among the received echo signals; and
   an available parking zone determination unit configured to determine whether the double echo condition is satisfied, the double echo condition being a condition that the calculated second echo distance is twice the first echo distance, discriminately recognize the surrounding target of the parking zone as a high object or a parked vehicle based on the determination result, and determine the available parking zone based on the recognition result.

3. The parking zone recognizing apparatus according to claim 2, wherein the available parking zone determination unit calculates the number of double echoes of the echo signals which are reflected back from a front and edges of the surrounding target during a preset sampling period, recognizes the surrounding target of the parking zone as a pillar when a double echo rate calculated based on the number of the double echoes from the front and the edges of the surrounding target is greater than a preset reference rate, and recognizes the surrounding target of the parking zone as a parked vehicle when the double echo rate is less than the reference rate.

4. The parking zone recognizing apparatus according to claim 2, wherein when only the high object is located as the surrounding target of the parking zone, the available parking zone determination unit determines an available parking zone from a position spaced from the high object by a predetermined distance.

5. The parking zone recognizing apparatus according to claim 2, wherein when the high object and the parked vehicle are located as the surrounding target of the parking zone, the available parking zone determination unit determines an available parking zone between the high object and the parked vehicle, the determined available parking zone being closer to the high object.

6. A parking zone recognizing apparatus for recognizing a parking zone based on transmission/reception signals which are transmitted and received through an ultrasonic sensor installed in a vehicle, the parking zone recognizing apparatus comprising:
   an electronic control unit configured to recognize a surrounding target of a parking zone as a high object and determine an available parking zone in the case of a double echo condition that a distance of a second echo signal is twice a distance of a first echo signal, the first echo signal and the second echo signal being determined among echo signals responding to the transmission signal transmitted through the ultrasonic sensor,
   wherein when a double echo signal is continuously received from the ultrasonic sensor for a predetermined time, the electronic control unit recognizes the surrounding target of the vehicle as a high object.

7. A method of controlling a parking zone recognizing apparatus for recognizing a parking zone based on transmission/reception signals which are transmitted and received through an ultrasonic sensor installed in a vehicle, the method comprising:
   performing control to recognize a surrounding target of a parking zone as a high object and determining an available parking zone in the case of a double echo condition that a distance of a second echo signal is twice a distance of a first echo signal, the first echo signal and the second echo signal being determined among echo signals responding to the transmission signal transmitted through the ultrasonic sensor.

8. The method according to claim 7, wherein the performing of the control comprises:
   receiving the echo signals responding to the transmission signal transmitted toward the proximity of the parking zone through the ultrasonic sensor;
   calculating a first echo distance to the surrounding target of the parking zone based on the first echo signal that exceeds a preset threshold for the first time among the received echo signals, and calculating a second echo distance to the surrounding target of the parking zone based on the second echo signal that exceeds the preset threshold for the second time among the received echo signals; and
   determining whether the double echo condition is satisfied, the double echo condition being a condition that the calculated second echo distance is twice the first echo distance, discriminately recognizing the surrounding target of the parking zone as a high object or a parked vehicle based on the determination result, and determining the available parking zone based on the recognition result.

9. The method according to claim 8, wherein the calculating of the first second distances comprises calculating the number of double echoes of the echo signals which are reflected back from a front and edges of the surrounding target during a preset sampling period, and calculating a double echo rate from the calculated number of the double echoes from the front and edges of the surrounding target, and the determining of the available parking zone comprises recognizing the surrounding target of the parking zone as a pillar when the calculated double echo rate is greater than a preset reference rate, and recognizing the surrounding target of the parking zone as a parked vehicle when the double echo rate is less than the reference rate.

10. The method according to claim 8, wherein when only the high object is located as the surrounding target of the parking zone, the available parking zone is determined from a position spaced from the high object by a predetermined distance.

11. The method according to claim 8, wherein when the high object and the parked vehicle are located as the surrounding target of the parking zone, the available parking zone is determined between the high object and the parked vehicle, the determined available parking zone being closer to the high object.

12. The method according to claim 8, wherein when a double echo signal is continuously received from the ultrasonic sensor for a predetermined time, the surrounding target of the vehicle is recognized as a high object.

* * * * *